United States Patent Office 3,634,387
Patented Jan. 11, 1972

3,634,387
SULFOMETHYLATED LIGNIN-FERROCHROME COMPLEX AND PROCESS FOR PRODUCING SAME
Walter K. Dougherty, Charleston, S.C., assignor to Westvaco Corporation, New York, N.Y.
No Drawing. Filed June 2, 1969, Ser. No. 829,803
Int. Cl. C07g 1/00
U.S. Cl. 260—124 R    5 Claims

ABSTRACT OF THE DISCLOSURE

A sulfomethylated lignin-ferrochrome complex made by reacting a water-soluble ferrous salt and a water-soluble chromate salt in stiochiometric amounts to form a ferrochrome salt solution, admixing with a sulfomethylated lignin material and then spray drying to form a dry, powdered product for use as a drilling mud thinner.

BACKGROUND OF THE INVENTION

This invention relates to a lignin-containing complex for use as a drilling mud thinner, especially for sea water mud, and a process for making the lignin-containing complex. More particularly, this invention relates to a complex comprising a sulfomethylated lignin-ferrochrome complex and to a process for making it.

The complicated problems accompanying the drilling of oil and gas wells have been at best only partially solved by the use of various drilling fluid compositions. Drilling fluids, most commonly referred to as drilling muds, come in several types depending upon the location of the well. The use of drilling muds removes cuttings from the well bore, lubricates the drill bit, suspends cuttings when the drill bit is stopped and forms a hydrostatic head for controlling the pressure of oil and gas in the well bore. Drilling muds alone are not effective in performing all of these functions and additives or thinners are added to the drilling mud to control various properties such as, viscosity, gel strength or fluid loss.

Numerous drilling additives have been developed since drilling of deep wells began. Some of the additives suggested ranged from clays to silicates to tall oil additives. However, the most recent emphasis has been placed on additives containing alignosulfonate either alone or in combination with heavy metals. Examples of such drilling mud additives are shown in U.S. Patents 2,935,504 and 3,035,042. The lignin-containing-ferrochrome complexes of these patents have met with a great deal of commercial success and are among the leading drilling mud additives, but their overall efficiency is impaired by deficiencies of one or more of the properties necessary to make an overall outstanding drilling mud additive, particularly initial properties such as, viscosity, gel strength and water loss.

The object of this invention is to provide a process for making an improved lignin-containing-ferrochrome complex. Another object of this invention is to provide an improved lignin-containing-ferrochrome complex for use as a drilling mud thinner. A further object is to provide a drilling mud thinner which effectively lowers the viscosity of drilling muds, produces muds having low gel strength and low water loss. Other objects will be evident in the following disclosure.

SUMMARY OF THE INVENTION

It has been discovered that a superior mud thinner may be obtained by reacting a sulfomethylated lignin with a ferrochrome salt solution to form a sulfomethylated lignin-ferrochrome complex. The process of this invention comprises mixing together in stoichiometric amounts in an aqueous solution a water soluble ferrous salt, such as ferrous sulfate in an acidified medium and a water soluble chromate, such as dichromate. The sulfomethylated lignin is then admixed with the ferrochrome salt solution. The aqueous mixture is then spray dried to form a powdered product which, when used as a drilling mud thinner, improves the physical properties of the drilling mud.

DETAILED DESCRIPTION OF THE INVENTION

The lignin-containing material.—The lignin materials suitable for use in the preparation of the complex of this invention include sulfomethylated lignins. In general, the sulfomethylated lignins used in this invention may come from any lignin source. One of the main sources of lignin is the paper and pulp industry where lignocellulosic materials such as wood, straw, corn stalks, bagasse, and the like are processed to separate the cellulose or pulp from the lignin. When lignin is obtained from the Kraft or sulfate pulping processes, it must first be sulfonated. In other pulping processes, such as the sulfite process, lignin is made soluble by sulfonation and thus separated from the cellulose by dissolving the spent liquor and is present in this liquor as a lignosulfonate. Any of the above-described sulfonated lignin materials may be used to produce the sulfomethylated lignin used in the present invention. The degree of refining to which these sulfonated lignin materials are subjected, will depend on the quality of product desired and upon the economic factors involved. That is, refining to some extent will improve the properties of the final processed product, but the degree of improvement will not always be economically justifiable.

Although sulfomethylated lignins from all sources are contemplated, the sulfomethylated lignins made from alkali lignin are preferred. Sulfomethylated alkali lignins may be produced by precipitating lignin from an alkaline spent pulp liquor by means of mineral acids, isolating the precipitated lignin, sulfonating the lignin with either sulfurous acid or water-soluble sulfite or bisulfite and adding formaldehyde to the lignin during sulfonation. Another method of producing sulfomethylated lignins for use in this invention is by adding formaldehyde to sulfonated lignin, and cooking it at 95° C. for 4–6 hours under non-oxidizing conditions.

The ferrochrome salt solution.—The ferrochrome salt solution is made by mixing together in an aqueous medium a water-soluble ferrous salt and a water-soluble chromate salt. The ferrous salt may be any water-soluble salts, such as iron sulfate, iron chloride, iron nitrate or iron acetate. The water-soluble chromate may be employed in the form of sodium, potassium and calcium chromates or dichromates with the dichromates being preferred primarily because of their lower costs.

The ferrous salt and the dichromate salt are mixed in stoichiometric amounts to give the necessary stability to the salt solution to prevent the availability of dichromate anion from oxidizing the sulfomethylated lignin when the complex is formed.

A mineral acid such as, hydrochloric acid, sulfuric acid, nitric acid or phosphoric acid and acetic acid, is preferably added to the salt solution to scavenge free oxygen formed during the reduction of the dichromate anion. It is essential, however, that the amount of the acid added to the ferrochrome salt solution be enough to prevent formation of a precipitate of hydroxides of iron or chromium upon admixing the sulfomethylated lignin solution with the ferrochrome salt solution. The oxidation-reduction of a ferrous salt and a dichromate salt is preferred for forming the salt solution to be used in the invention and the reaction may be shown as:

$$6Fe^{2+}+2Na^{+}+14H^{+}+6(SO_4)^{2-}+(Cr_2O_7)^{2-}+14Cl^{-} \rightarrow$$
$$6Fe^{3+}+2Cr^{3-}+2Na^{-}+6(SO_4)^{2-}+14Cl^{-}+7H_2O$$

In effect the ferrous cation is oxidized to the ferric cation and the dichromate anion is reduced to the chromic cation. Other salt water-soluble solutions having stoichiometric amounts of ferric cation and chromic cation may be used in place of the salt solution preferred. The ferrous salt and dichromate salt should be continuously agitated to aid the oxidation-reduction reaction.

The resulting ferrochrome salt solution is then admixed with the sulfomethylated lignin and the aqueous solution is allowed to interact until a sulfomethylated lignin-ferrochrome complex is foremd. The pH of the resulting complex solution should be regulated to a value between 2 and 6, preferably about 3. As the pH of the complex gets above about 5 the viscosity advantages become lost. The ferrochrome salt solution is usually very acidic; however, additional acid should be added to the complex to bring it within the proper pH range.

In the preferred embodiment of this invention the sulfomethylated lignin-ferrochrome liquid complex is spray dried in conventional spray drying equipment to produce a free-flowing, powdered sulfonated lignin-ferrochrome complex for use as a thinner in well drilling muds. Other methods of drying, i.e., freeze drying, although satisfactory, have not produced drilling mud thinners having quite the properties of those which have been spray dried.

Although the relative proportions of the ferrochrome salt solution to sulfomethylated lignin may vary within a wide range, the practical applications have indicated that the sulfomethylated lignin material should be present in the complex in an amount of at least 50% by weight total solids basis, the remainder being the ferrochrome salt solution. The preferred amount of sulfomethylated lignin in the total product is 60% to 80% by weight of the total complex.

A defoaming agent is frequently incorporated into the sulfomethylated lignin-ferrochrome complex prior to drying in order to prevent air entrainment in the mud while drilling. Suitable defoaming agents include aliphatic alcohols having at least four carbon atoms in the molecule, such as amyl, lauryl, stearyl, cetyl alcohols. Other satisfactory defoaming agents include sulfonated castor oils, substituted imidazolines and substituted oxazolines. The amount of defoaming agent incorporated into a drilling mud thinner varies to a certain extent on the type of the defoaming agent and the nature of the drilling mud in which it is to be used. An amount of 0.1–1% of the defoamer, based on the solids content of the drilling mud thinner has been found satisfactory.

The amount of sulfomethylated lignin-ferrochrome complex to be supplied to a drilling mud will vary depending on the type of the drilling mud employed in the drilling operation; however, amounts up to 8 pounds of drilling mud thinner per barrel of drilling mud are not uncommon. For instance, in sea water muds the sulfomethylated lignin-ferrochrome complex of this invention perform very well giving a sufficiently low viscosity at high solids content and satisfactory gel strength with low water loss. Performance in other type drilling muds, i.e., fresh water muds and gypsum muds, also gives satisfactory reduction in viscosity, gel strength and water loss.

The practice of this invention may clearly be seen in the following examples.

Example 1

A ferrochrome salt solution was formed by adding to 3000 ml. of water containing 408 ml. of concentrated hydrochloric acid, 480 grams of industrial grade ferrous sulfate (57% ferrous sulfate) and then 105 grams of sodium dichromate dihydrate. The ferrochrome salt solution was then added to a solution of 6810 ml. of sulfomethylated alkali lignin at 30% total solids. The constituents were thoroughly mixed to form a sulfomethylated-ferrochrome complex. The complex was further acidified to pH 3.0. To the complex 22.5 grams of Alkaterge C (a substituted oxazoline defoamer) was added prior to drying. The aqueous complex was then spray dried at air inlet temperature of 450° F. and air outlet temperature of 250° F. The resulting complex was a dark powdered product.

Example 2

In order to evaluate the effectiveness of the sulfomethylated lignin-ferrochrome complex in a drilling mud, samples of Example 1 were compared directly to a leading commercial additive in a sea water mud. The sea water mud consisted of 5.25% Aquagel (a finely ground bentonite clay), 9.75% Zeogel (a ground attapulgite clay) and 85% sea water. The initial properties of sea water drilling mud with 8 pounds of thinner per barrel were (pH of the sea water mud was adjusted 9.5 for testing):

| Sample | Initial viscosity, cps.[1] | Plastic viscosity, cps. | Yield point | Initial gel (10″) | Fluid loss, cc. |
|---|---|---|---|---|---|
| 1 | 40 | 12 | 15 | 35 | |
| 2 | 40 | 12 | 14 | 35 | |
| 3 | 39 | 12 | 15 | 34 | 31 |
| (2) | 71 | 15 | 35 | 55 | 49 |

[1] Fann viscosity at 600 r.p.m.
[2] Leading commercial additive.

These tests show that the sulfomethylated lignin-ferrochrome complex of this invention when first added to a sea water mud shows remarked superiority to a leading commercial drilling mud additive. These initial improvements are important because it is not necessary to wait for the drilling mud to age to obtain lower viscosity, thereby having a drilling mud which is immediately easily pumped and handled.

Example 3

Another evaluation of the sulfomethylated lignin-ferrochrome complex of Example 1 was made with a second leading drilling mud additive. The first table shows initial properties and the second table compares properties of both sea water muds after aging and at various load levels.

INITIAL RESULTS

| LBS./BBL. | Thinner sample | Initial viscosity, cps.[2] | Apparent viscosity, cps. | Plastic viscosity, cps. | Yield point | Gel Init. | Gel 10 mins. |
|---|---|---|---|---|---|---|---|
| 2 | 4 | 115 | 57.5 | 12 | 71 | | 34 |
|   | Commercial[1] | 206 | 103 | 27 | 152 | | |
| 4 | 5 | 42 | 21 | 9 | 24 | 32 | 82 |
|   | Commercial[1] | 117 | 58.5 | 14 | 89 | | 37 |
| 6 | 6 | 27 | 13.5 | 9 | 9 | 26 | 93 |
|   | Commercial[1] | 70 | 35 | 12 | 46 | 54 | 50 |
| 8 | 7 | 30 | 15 | 11 | 8 | 20 | 95 |
|   | Commercial[1] | 62 | 31 | 15 | 32 | 44 | 160 |

VALUES ON MUD AGED 16 HRS. AT 150° F. (65° C.)

| LBS./BBL. | Thinner sample | Initial viscosity, cps.[2] | Apparent viscosity, cps. | Plastic viscosity, cps. | Yield point | Gel Init. | Gel 10 min. | Fluid loss, cc. |
|---|---|---|---|---|---|---|---|---|
| 2 | 8 | 122 | 61 | 3 | 116 | | 51 | 61 |
|   | Commercial[1] | 180 | 90 | 22 | 136 | | 61 | 67 |
| 4 | 9 | 42 | 21 | 11 | 20 | 24 | 34 | 53 |
|   | Commercial[1] | 72 | 36 | 10 | 52 | 48 | 14 | 53 |
| 6 | 10 | 22 | 11 | 8 | 6 | 8 | 25 | 56 |
|   | Commercial[1] | 32 | 16 | 10 | 12 | 20 | 42 | 49 |
| 8 | 11 | 25 | 12.5 | 13 | −1 | 3 | 22 | 47 |
|   | Commercial[1] | 27 | 13.5 | 12 | 3 | 7 | 30 | 31 |

[1] The commercial additive was Q-Broxin manufactured by Georgia-Pacific Corporation.
[2] Fann viscosity at 600 r.p.m.

The results show that the sulfomethylated lignin-ferrochrome complex of this invention possesses remarkably superior initial properties over the commercial drilling mud additives. Upon aging, the properties of the complex of this invention were at least as good as those of the commercial additive.

While the invention has been described and illustrated herein by references to various specific materials, procedures and examples, it is understood that the invention is not restricted to the particular materials, combinations of materials, and procedures selected for that purpose. Numerous variations of such details can be employed as will be appreciated by those skilled in the art.

I claim:

1. As a drilling mud thinner a sulfomethylated alkali lignin-ferrochrome complex consisting essentially of at least 50% by weight of a sulfomethylated alkali lignin reacted with a ferrochrome salt solution comprising stoichiometric amounts of ferric ions and chromic ions and the pH of said complex being between 2 and 6.

2. A process for preparing a sulfomethylated alkali lignin-ferrochrome complex for use as a drilling mud thinner which consists essentially of reacting together a ferrochrome salt solution and at least 50% by weight of the total complex of a sulfomethylated alkali lignin, adjusting said complex to a pH of between 2 and 6, and thereafter drying the resulting sulfomethylated lignin-ferrochrome complex, said ferrochrome salt solution comprising stoichiometric amounts of ferric ions and chromic ions.

3. The process of claim 2 wherein said ferrochrome salt solution is made by reacting a water-soluble ferrous salt and a water-soluble dichromate salt.

4. The process of claim 3 wherein said water-soluble dichromate salt is sodium dichromate and said water-soluble ferrous salt is ferrous sulfate.

5. The process of claim 2 wherein said sulfomethylated lignin is 60% to 80% by weight of the total weight of said sulfomethylated lignin-ferrochrome complex.

References Cited

UNITED STATES PATENTS 3,171,811   3/1965   Keirstead et al.   260—124 X
3,347,788   10/1967   Sohn et al.   260—124 X CHARLES B. PARKER, Primary Examiner D. R. PHILLIPS, Assistant Examiner U.S. Cl. X.R.

252—8.5 C

UNITED STATES PATENT OFFICE
CERTIFICATE OF CORRECTION

Patent No. 3,634,387      Dated January 11, 1972

Inventor(s) Walter K. Dougherty

It is certified that error appears in the above-identified patent and that said Letters Patent are hereby corrected as shown below:

Column 1, line 48, "alignosulfonate" should read -- lignosulfonate --.

Column 3, lines 3-5, the reaction should read, $$6\ Fe^{2+} + 2Na^+ + 14H^+ + 6(SO_4)^{2-} + (Cr_2O_7)^{2-} + 14\ Cl^- \longrightarrow$$

$$6\ Fe^{3+} + 2Cr^{3+} + 2Na^+ + 6(SO_4)^{2-} + 14\ Cl^- + 7H_2O$$

Column 3, line 16, "foremd" should read -- formed --.

Column 5, in the Table under Fluid loss, cc., "53" (second occurrence) should read -- 56 --; and "56" should read -- 53 --.

Signed and sealed this 27th day of June 1972.

(SEAL)
Attest:

EDWARD M. FLETCHER, JR.      ROBERT GOTTSCHALK
Attesting Officer      Commissioner of Patents